July 11, 1933. J. H. WIGGINS 1,917,623
STORAGE TANK FOR VOLATILE GASES AND LIQUIDS
Filed Feb. 3, 1930

INVENTOR:
J. H. WIGGINS.
BY Bakewell & Church
ATTORNEYS

Patented July 11, 1933

1,917,623

UNITED STATES PATENT OFFICE

JOHN H. WIGGINS, OF TULSA, OKLAHOMA

STORAGE TANK FOR VOLATILE GASES AND LIQUIDS

Application filed February 3, 1930. Serial No. 425,667.

This invention relates to storage tanks for volatile liquids and gases of the type in which the roof or top of the tank is capable of flexing upwardly and downwardly a limited distance from a horizontal plane so as to increase and decrease the vapor space of the tank without liability of setting up injurious strains in the roof and particularly to a novel form of volume-control pressure relief valve or vent valve for such tanks.

The objects of my present invention are to simplify the construction and installation of pressure relief valves for storage tanks of the type mentioned, and provide an improved means for unseating the valve element during the upward movement or flexing of the roof on which the valve is mounted.

Figure 1 of the drawing is a vertical transverse sectional view of a storage tank equipped with a volume-control pressure relief valve or vent valve embodying my present invention.

Figure 1:
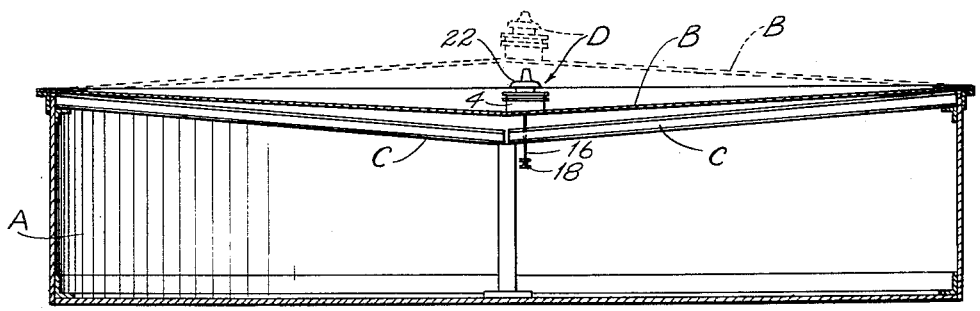

In the drawing, A designates a storage tank which is provided with a roof or top B that is capable of flexing upwardly and downwardly a limited distance from a horizontal plane, so as to increase and decrease the vapor space of the tank, without liability of setting up injurious strains in the roof. When the internal pressure of the tank becomes greater than the weight of the roof, due to the expansion of the gases or vapors in the tank, the roof will flex upwardly, and thus increase the volume of the vapor space in the tank. Thereafter, when the internal pressure of the tank diminishes, the roof will flex downwardly, thus automatically decreasing the volume of the gas or vapor space. Normally, the roof occupies a downwardly deflected position, as shown in full lines in Figure 1, and at such times the roof is sustained by a stationary supporting structure inside of the tank comprising radially-disposed members C. When the internal pressure of the tank becomes greater than the weight of the roof, due to the expansion of the gases and vapors in the tank, the roof B flexes upwardly more or less, as indicated by broken lines in Figure 1.

Figure 2:
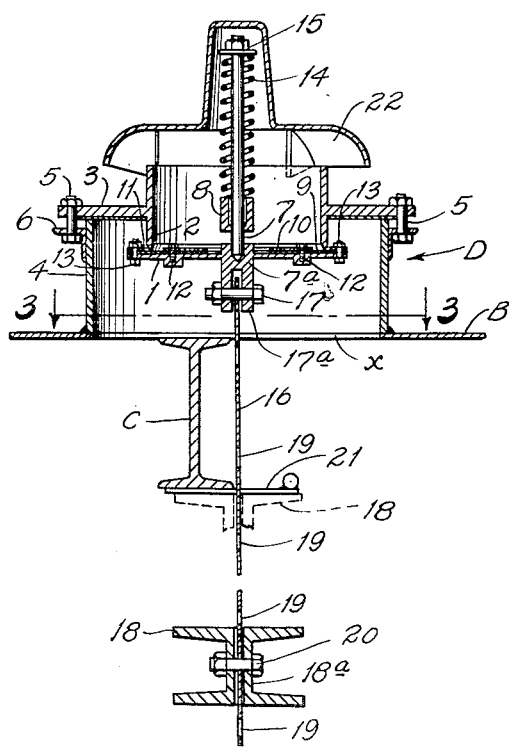
Figure 2 is a vertical sectional view of said valve.

The roof B is provided with a volume-control pressure relief valve or vent valve, designated as an entirety by the reference character D, that opens automatically and permits gases and vapors to escape from the tank when the roof reaches a certain approximate position during its upward movement. Said valve D comprises a valve element 1 arranged on the underside of an annular valve seat member 2 which is herein illustrated as being formed integral with a horizontally-disposed plate 3 that is held tightly against the top edge of a manhole formed by an annular member 4 that projects upwardly from the roof B of the tank so as to form in effect an upwardly-projecting flange or collar that surrounds a hole $x$ in the roof. As shown in Figure 2, the valve seat 2 and the valve element 1, are arranged high enough above the top side of the roof so that said valve element will be spaced away from the liquid stored in the tank in the event the tank is filled with liquid to such a depth that the central portion of the roof contacts with the liquid. The collar 4 may be connected to the roof B in any preferred or suitable manner, so long as said parts are connected together by a gas-tight joint, and any suitable means may be used to maintain a gas-tight joint between the plate 3 and the top edge of the collar 4, the means herein illustrated consisting of bolts 5 that pass vertically through holes in the plate 3 and aligned holes in a laterally-projecting flange 6 on the collar 4. The valve element 1, which preferably consists of a casting, is provided with a stem 7 that projects upwardly from same through a guide 8 arranged at the center of and integrally connected with the annular member 2 that constitutes the seat for the valve. Usually, the stem 7 will be formed from a rod or piece of tubing whose lower end is screwed into an internally-threaded hole formed in a center lug or projection 7ª on the casting that constitutes the valve element 1. In order to produce a tight joint between the bottom edge of the annular member 2 that constitutes the valve seat and the valve element 1 with which it co-acts, a piece of non-metallic material 9, preferably felt, is secured to the top face of the valve element 1 in any suitable way, as, for example, by means of annular clamping plates 10 and 11 arranged in overlapping relation with the felt 9 at points on the inside and outside of the annular valve seat 2. Machine screws 12 are preferably screwed into holes in the top face of the valve element 1, so as to retain the clamping member 10 in position, and bolts 13 are provided for connecting the clamping member 11 to the valve element 1. If desired, the bottom edge of the annular valve seat member 2 may be beveled, as shown in Figure 2, so as to form in effect a knife seat for the valve, but it will, of course, be understood that various other means may be used to provide a tight joint between the valve 1 and its cooperating seat 2 without departing from the spirit of my invention.

Figure 3:
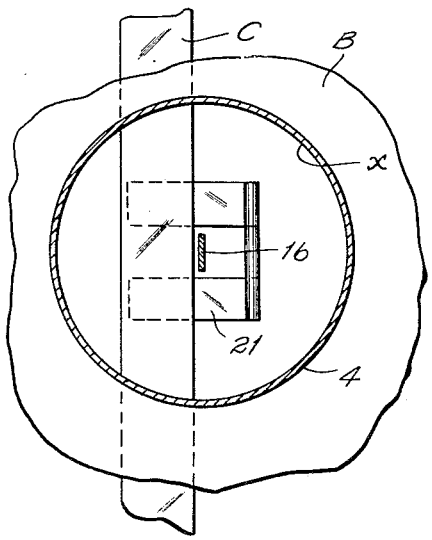
Figure 3 is a horizontal sectional view, taken on the line 3—3 of Figure 2, looking in the direction indicated by the arrows.

A coiled expansion spring 14 that surrounds the valve stem 7 between the guide 8 and an abutment 15 on said stem normally exerts an upward pull on the valve 1 so as to hold it seated, and a depending device is attached to the valve 1 so as to co-act with a part on the inside of the tank to exert a direct pull on the valve in a direction to open the same during the upward movement of the roof B. In the form of my invention herein illustrated the depending device just referred to consists of a pull rod or link 16 whose upper end is pivotally connected by a bolt 17 to a bifurcated lug 17ª on the underside of the valve element 1, and said pull rod is provided with an adjustable stop member 18 that is adapted to co-act with one of the members C of the supporting structure inside of the tank to unseat the valve element 1. During the upward movement of the roof B, from its depressed towards its elevated position, the stop member 18 on the pull rod 16 comes into engagement with one of the stationary members C of the roof supporting structure, thereby arresting the upward movement of the valve element 1 and causing it to remain at rest while the roof B and the valve seat member 2 continue to move upwardly, which action, of course, results in unseating the valve 1. As soon as said valve has been unseated or opened, gases or vapors escape from the vapor space of the tank, thereby relieving the internal pressure of the tank and preventing the roof from being subjected to destructive strains, the roof moving downwardly to its normal position as the internal gas volume of the tank diminishes, and finally coming to rest in the position shown in full lines in Figure 1 when the internal pressure of the tank becomes less than the weight of the roof. In order that the action or operation of the valve 1 may be varied or accurately controlled, the stop member 18 on the pull rod 16 is so constructed that it can be adjusted vertically so as to come into engagement with its co-operating member C sooner or later during the upward movement of the roof. Preferably, the member 18 is designed so that it is impossible to arrange it in other than a correct position on the pull rod, and while various means may be used for adjustably mounting said member on the pull rod, I have herein illustrated the pull rod as being provided with a number of holes 19, any one of which is adapted to receive a bolt 20 or other suitable device that passes transversely through the center of a web 18ª on the member 18 that has a vertically-disposed hole for receiving the pull rod 16. In order to prevent the pull rod 16 from moving into an incorrect position, wherein the member 18 thereon will not properly engage the stationary roof supporting member C with which it co-operates to exert a direct pull on the valve 1 to open the same, I have provided said member C with a guide 21 through which the pull rod 16 passes, as shown in Figures 2 and 3, said guide 21 having a center space that is of sufficient dimensions to prevent the pull rod from binding on the guide without liability, however, of the pull rod moving relatively to the member C into such a position that the unseating means for the valve 1 will fail to function properly during the upward movement of the roof B. Usually, a rain hood or shield 22 will be arranged over the upper end of the annular valve seat member 2, so as to protect the movable parts of the structure from the elements.

A volume-control pressure relief valve or vent valve of the construction above described is inexpensive to build, is easy to assemble and install, and it is highly reliable in operation, due to the fact that the guide for the valve stem and the spring which holds the valve seated are arranged outside of the vapor space of the tank, and hence, are not liable to be injuriously affected by corrosion produced by action of the gases or vapors being stored, and due also to the fact that the unseating or opening of the valve is produced by direct contact or engagement between one of the stationary roof supporting members C and a part 18 carried by a pull rod or the like on the underside of the valve which is confined in a certain approximate position by the guide 21 on said roof supporting member.

Having thus described my invention, what I claim as new and desire to secure by Letters Patent is:

1. In a storage tank of the type which is provided with a metal roof that is adapted to flex upwardly and downwardly to vary the volume of vapor space of the tank, the combination of a stationary structure in the tank adapted to serve as a support for the roof under certain conditions, a valve seat mounted on the top side of the roof, a valve element on the underside of said valve seat arranged at a point above the top side of the roof, a spring arranged above the valve element outside of the vapor space of the tank, for normally holding said valve element seated, and a means suspended from said valve element for unseating the same, said means comprising a pull rod carried by the valve element and depending from the same, and a stop member on said pull rod that is adapted to strike against a part of said stationary structure when the roof flexes upwardly a certain distance, whereby the bodily upward movement of the valve element will be arrested, with the result that the continued upward movement of the roof causes the valve seat to move out of engagement with the valve element, thereby automatically venting the vapor space of the tank.

2. A storage tank of the kind described in claim 1, comprising a pivotal connection between the pull rod and the valve element, and a guide on said stationary structure provided with an elongated opening for the pull rod, for restricting the swinging movement of said pull rod.

3. A storage tank of the kind described in claim 1, provided with means for enabling the stop member to be adjusted vertically on the pull rod so as to vary the point in the upward movement of the roof at which the valve element will be unseated to vent the vapor space.

4. A storage tank of the kind described in claim 1, in which the stop member consists of reversible devices removably mounted on the pull rod.

JOHN H. WIGGINS.